Dec. 13, 1966     T. L. GOFF ETAL     3,290,784
OPTICAL FOOTBALL YARDAGE INDICATOR
Filed July 31, 1964     2 Sheets-Sheet 1
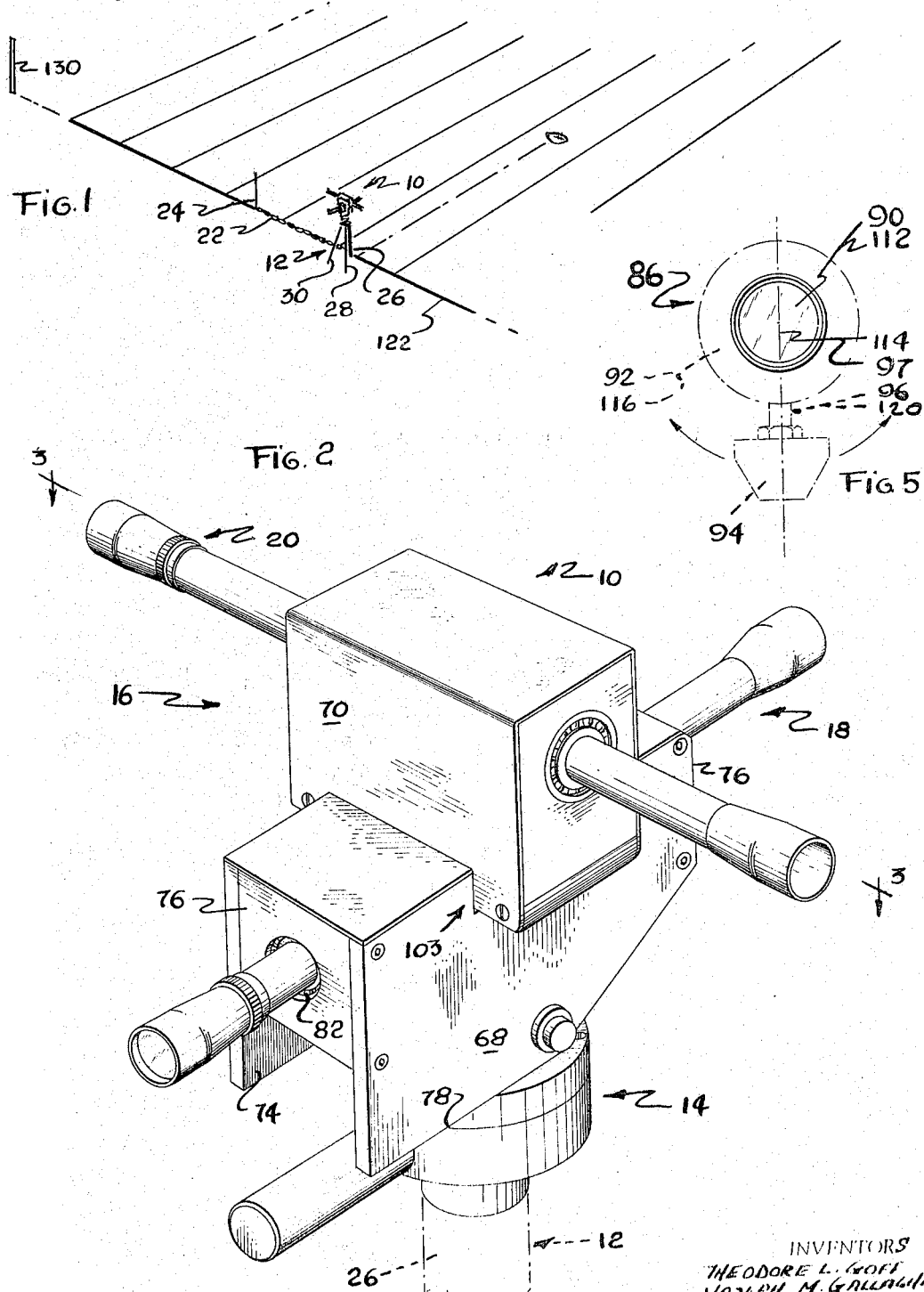
INVENTORS
THEODORE L. GOFF
JOSEPH M. GALLAGHER
JULIUS HALSMAN
WILLIAM J. NAGEL
BY Patterson, Wright & Sullivan
ATTORNEYS Dec. 13, 1966     T. L. GOFF ETAL     3,290,784
OPTICAL FOOTBALL YARDAGE INDICATOR
Filed July 31, 1964     2 Sheets-Sheet 2
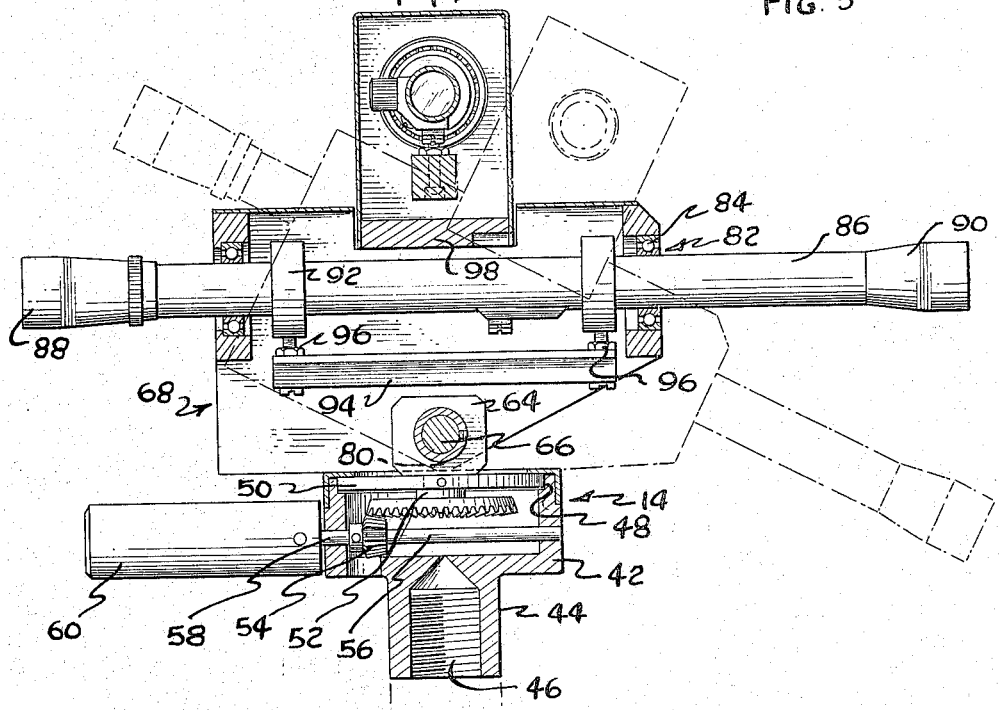
FIG. 3
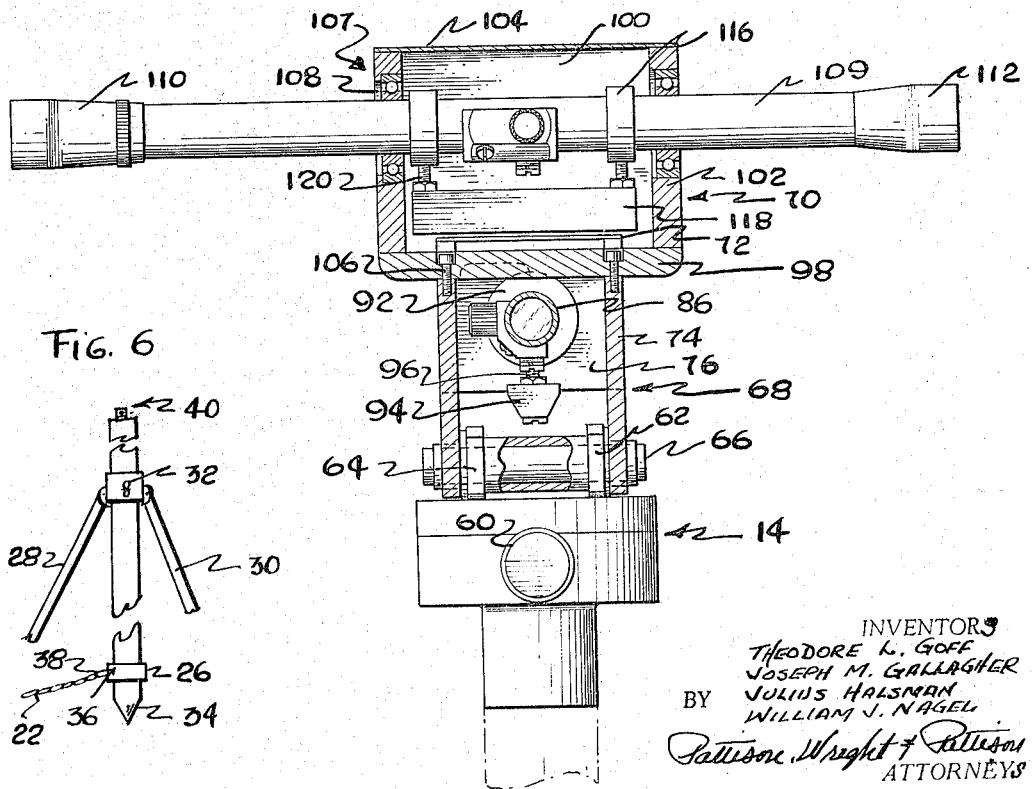
FIG. 4
FIG. 6
INVENTORS
THEODORE L. GOFF
JOSEPH M. GALLAGHER
BY JULIUS HALSMAN
WILLIAM J. NAGEL
Pattison, Wright & Pattison
ATTORNEYS

3,290,784
OPTICAL FOOTBALL YARDAGE INDICATOR
Theodore L. Goff, 4412 18th St. N., Arlington, Va.;
Joseph M. Gallagher, 10605 Ordway Drive, Silver
Spring, Md.; Julius Halsman, 4713 7th St. S., Arlington, Va.; and William J. Nagel, 11815 Gainsboro Road,
Rockville, Md.
Filed July 31, 1964, Ser. No. 386,604
12 Claims. (Cl. 33—63)

The present invention relates to new and useful improvements in geometric devices and more particularly and specifically to a visual instrument for use in determining the exact position of a football on a playing field with respect to a fixed reference indicating a previous position of the ball on the field.

This invention additionally relates to a visual instrument for use in establishing and laying out the boundaries and yardage markers of a football playing field.

It is general knowledge that in the game of football the rules contemplate and require that a continuous determination be made as to whether or not the team in possession of the ball has moved the ball longitudinally of the field a distance of ten yards from the position in which the ball rested at the time the team obtained possession thereof, and, if such team in possession does so move the ball a distance of ten yards or more, that a continuing determination be made in order that an indication be given as to whether the team moves a subsequent ten-yard distance from the position the ball attained in the play on which they exceeded the previous ten-yard requirement.

It is the present, common practice in officiating a football game to utilize two vertical stakes having a chain of ten yards length secured between the base ends of the stakes, and to utilize the stakes by locating one stake along the sideline of the field opposite the position of the ball at the point where the team in possession acquires possession of the same and to then locate the second stake longitudinally of the sideline in the direction in which the team in possession is required to move the ball. The foregoing establishes at the point of the second stake longitudinally of the field a reference point transversely of the field which must be attained by the team in possession of the ball in order to entitle it to a "first down."

Incident to the use of the chained stakes it is necessary, when a question arises as to whether the ball, in fact, has been moved to coincidence with the advanced stake position, to move the two stakes transversely of the field to align longitudinally thereof with the ball in order that it may be determined physically whether the ball has, in fact, attained the longitudinal position of transverse alignment with the advanced stake.

The present, common practice of utilizing two chained stakes longitudinally of the sideline of the field requires repeated time-consuming and game-delaying periods of "running the chain" onto the field to determine whether or not a team in possession has attained a first down, and the movement of the chain onto and off the field lends to the ultimate inaccuracy of the use of the chained stakes as a result of the human error in placing and replacing the stakes in coincidence with the position of the ball when the same placement and replacement is done by human eye alignment transversely of the field.

Numerous and various prior art devices have been devised to overcome the game-delaying, inaccurate practice of utilizing the common chained stakes as first down measurement means, however, the complexities and failings of these prior art devices have resulted in the continued use of the inherently inaccurate and time-consuming chained stake means.

It is, therefore, a general object of the present invention to provide a visual instrument for continuously determining the advance of the ball longitudinally of the field which obviates and eliminates the game-delaying and inaccurate problems of the chained stake means currently in use and which further overcomes and eliminates the problems and failings inherent in the many prior art devices which have been devised in an unsuccessful attempt to replace the chained stake means.

It is a primary object of the present invention to provide a new and improved visual instrument for accurately and efficiently maintaining continuous determination of the advances of a football longitudinally of a playing field.

It is a principal object of this invention to provide a new and improved visual instrument which incorporates a telescopic element directed transversely of the playing field and maintained in absolute perpendicular relationship to the sideline of the field at all times for immediate visual determination as to whether or not a football has advanced to or passed the transverse visual reference of the telescope at any time.

It is still a further object of the present invention to provide a visual instrument for continuously determining the advance of a football longitudinally of a playing field which incorporates two telescopes in fixed perpendicular relationship one to the other, each of which is provided with a self-levelling vertical hairline which enables the exact and accurate positioning of the instrument at any point longitudinally of the sideline of the field regardless of the unlevel conditions which may exist therealong, thus providing an absolute telescopic fix transversely of the field with a hairline reference point indicating the advance position necessary to be attained by a football to achieve a first down.

A still further object of the present invention resides in the provision of a visual instrument for maintaining continuous determinaiton of the attainment of a first down in the playing of the game wherein the instrument is quick and accurate in use with quick and ready adjustment capabilities for proper alignment in the positioning of the instrument to establish an accurate telescopic hairline reference transversely of the field, and an instrument which is relatively inexpensive of design and manufacture and durable and long-lasting in extended use.

Another object of the present invention resides in the provision of a novel and unique geometrical instrument which is particularly adaptable in laying out and marking off a football playing field to insure that all lines or markers thereon are in proper perpendicular and/or parallel relationship.

Still further objects and advantages of the present invention will become readily apparent to those skilled in the art when the following general statement and description are read in the light of the accompanying drawings.

The nature of the present invention may be described in general terms as relating to a visual instrument for maintaining constant determination of the attainment of first down yardage in the playing of a football game which includes a vertical standard having one component thereof depending centrally therebeneath, a chain of ten-yard length secured between the central standard component and the base of a vertical stake, a rotatable platform secured on the upper end of said standard, a pair of telescopes supported above said platform in fixed perpendicular relationship one to the other, vertical reference lines in each telescope, and means urging said telescopes to automatically assume positions whereby said vertical reference lines will at all times be in absolute vertical planes.

Referring now to the acompanying drawings in which like numerals indicate similar parts throughout the several views:

FIG. 1 is a pictorial illustration of the instrument constituting the persent invention in position on a football playing field;

FIG. 2 is a perspective view of the instrument excluding the supporting standard therefor;

FIG. 3 is a vertical section taken on line 3—3, FIG. 2;

FIG. 4 is a vertical section taken on line 4—4, FIG. 3;

FIG. 5 is an outside end view of one of the telescope elements illustrating the vertical hairline thereof; and FIG. 6 is a fragmentary elevation of the tripod standard.

In the embodiment of the invention as shown in the accompanying drawings, and with particular reference to FIGS. 1 and 2, it is seen that the optical instrument constituting the present invention, generally designated at 10, consists of a tripod type supporting standard 12 secured beneath a turntable platform 14 above which is mounted a housing assembly 16 for two telescopic elements 18 and 20. Associated with the instrument and forming a cooperative component of the combination assembly is a ten-foot chain length 22 and a single vertical standard 24.

The tripod standard (FIG. 6) consists of a primary vertical leg element 26 and two supporting leg elements 28 and 30 which are adjustably secured on the primary leg element by a telescopic set screw locking sleeve 32 to permit collapse and extension thereof from and into divergent angularly disposed supporting positions relative to the primary leg element when it is disposed in a vertical condition. The base end of the primary leg element is provided with a centrally depending conical point 34 and immediately thereabove with a ring member 36 rotatably engaged on the leg and provided with a horizontally projecting eye formation 38. The upper extremity of the primary leg element of the tripod assembly is provided with a projecting threaded tang 40.

With reference to FIGS. 3 and 4, the turntable assembly 14 consists of a circular housing 42 having an open top therein and a centrally depending circular boss 44 therebeneath which is provided with a bottom opening threaded socket 46 for the threaded reception of the threaded tang 40 on the upper extremity of the primary leg of the tripod assembly. The inner wall of the turntable housing defining the upper open end thereof is formed with an annular bearing shoulder 48 therein for the reception of a flat rotating disc 50 which rides on said bearing shoulder and encloses the upper end of the housing. The disc 50 is provided on the underside thereof with a circular gear rack 52 the teeth of which are disposed downwardly within the housing, and a pinion gear 54 engaged with said rack is supported on a shaft 56 traversing said housing and having rotating support therein with an extension 58 of said shaft projecting outwardly through the wall of the housing to support a handle 60 thereon for rotation of the shaft and the pinion gear within the housing.

The upper face of the rotating plate enclosing the top of the turntable housing supports two bearing trunnions 62 and 64 in diametrically spaced relationship thereon and a pin 66 is rotatably supported between and in the trunnions with portions thereof projecting radially outwardly from the center of said rotating plate. Associated with and supported by the rotating plate and the pin 66 is the housing assembly for the telescopic elements which consists of a lower housing component 68 of generally rectangular configuration which is supoprted on the turntable housing by pin 66, as will be hereinafter described, and a second rectangular housing 70 disposed with the longitudinal length thereof perpendicularly to the longitudinal length of the housing component 68 and which is supported by the first-named housing assembly component.

The lower housing assembly component 68 consists of a top wall 72, depending side walls 74 on the longitudinal edges thereof and depending end walls 76 on the short sides thereof. Each side wall member 74 is defined by a bottom edge 78 which is parallel to the plane of the top wall from one end to a point 80 intermediate the length thereof at which point the bottom edge inclines upwardly through the remote end edge of the member. Each of the end walls 76 depends from the top wall a distance less than the greatest vertical side measurement of the side walls and coincides with the plane of intersection of the inclined edges of the bottom walls with the end edges thereof at the one end of the housing component.

The housing assembly 68 is positioned above the turntable assembly with the point 80 on the bottom edge of each side wall member thereof positioned immediately outside of one of the bearing trunnions 62 or 64, and pin 66 extends through and is fixed to each side wall to pivotally support the housing assembly on the turntable assembly.

Each end wall 76 of the housing assembly component 68 is provided with a roller bearing 82, said bearings being horizontally aligned longitudinally of the housing and the races 84 thereof support an elongated telescope 86 therein. The ends of the telescope 86 project beyond the remote ends of the housing providing an eye piece 88 at one end thereof and a sight lens 90 in the second end thereof. Within the housing the tubular telescope casing is fitted with two spaced collar members 92 rigidly fixed thereon, each of which collar members supports one of the remote ends of an elongated bar weight 94 by bolt attachments 96 between said weight and said collars. The collars and weight are so affixed to the telescope casing that the weight depends in absolute vertical alignment below each collar. The sight lens of the telescope 86 is provided with a hairline 97 diametrically thereof which is in vertical coincidence with the longitudinal centerline of the weight element 94 secured beneath the telescope element.

The upper housing component 70 of the housing assembly consists of a bottom wall 98, side and end walls 100 and 102, supported thereabove, and a top wall 104 overlying the upper edges of the side and end walls and enclosing the housing. The longitudinal side walls 74 and the top wall 72 of the lower component of the housing assembly are cut away as at 103 to receive in recessed position transversely thereof the rectangular top housing component which is secured in place by threaded members 106 opening downwardly through the bottom wall of the upper unit and engaging in the side walls 74 of the lower unit. The end walls 102 of the upper component of the housing assembly, like the end walls of the lower component, support roller bearings 107 in horizontal alignment therein which in turn support in the races 108 thereof a second telescope 109 therein and in projection therebeyond. The second telescope 109 has an eye piece 110 at one end thereof and a sight lens 112 at the second end which is provided with an etched diametric hairline 114.

Within the upper housing component the telescope is provided, like the telescope within the lower housing, with longitudinally spaced collars 116 rigidly fixed thereon and an elongated weight 118 suspended longitudinally therebeneath by threaded members 120 secured in and depending from each of the collars. As in the case of the telescope member 86 in the lower component, the weight 118 is radially, eccentrically disposed of the telescope in vertical coincidence with the hairline etched in the sight lens of the telescope.

In the foregoing described assembly the longitudinal axes of the two telescope members 86 and 109 are in absolute perpendicular relationship and the horizontal planes of the two telescopes defined by the longitudinal axes thereof are in absolute parallel relationship.

To complete the combination construction of the assemblies hereinbefore described the ten-foot length of chain 22 is secured at one end thereof to the eye member 38 at the base end of the primary leg 26 of the tripod assembly with the second end thereof secured adjacent the base end of the ground engaging post or stake 24.

Further elements of the combination forming a part of the present invention are vertical reference elements 130, such as white posts or stake elements, which are positioned beyond the ends of one longitudinal sideline of the football playing field in absolute longitudinal alignment with that sideline and each being fixed in absolute vertical relationship to the horizontal level of the playing field.

The utilization of the visual instrument hereinbefore described in connection with the playing of a game of football may be described as follows:

Following the kickoff play of the game and after the football has been established by an official at a point on the field constituting the line of scrimmage from which the first play of the game following the kickoff will commence, the instrument is positioned on the sideline of the field transversely opposite the ball in such a manner that the vertical hairline in the telescope 86 of the lower unit will exactly coincide with the advanced nose point of the ball in the direction in which the team in possession is required to move the ball, with the primary leg of the tripod resting on the chalked or painted sideline 122 of the playing field. Then, at the point at which the primary leg engages the chalked or painted sideline of the field the stake or post element 24 is engaged with the ground on the sideline and held fixed at that point, whereupon the instrument is moved longitudinally of the field in the direction in which the ball is to be advanced to the limit of the ten foot chain engaged on the base end of the primary leg of the tripod standard of the instrument. With the chain in a taut condition, the base end of the primary leg 30 of the tripod is then positioned on the chalked or painted sideline of the field with the other two legs 26 and 28 positioned away from the playing field and engaged with the ground in such a manner so as to maintain the primary leg in a substantially vertical position above the chalk line. Thereafter, the official manning the instrument needs only to rotatably adjust the turntable of the instrument by use of the handle 60, rotating the entire housing assembly through use of this accurate control to fix the hairline of the telescope in the lower housing assembly on the reference marker 130 at one end of the sideline of the field.

When the instrument has been fixed on the sideline by the official as described with one of the reference markers 130 aligned with the vertical hairline of the telescope 109 in the upper housing component, the telescope 86 in the lower housing component will then be fixed absolutely perpendicularly of the field and the vertical hairline therein will establish an absolute determining reference point for a ten-yard advance position on the field from the position of the ball as fixed at the line of scrimmage by the stake 24. The official will then be able to determine by sighting through the telescope 86 of the lower component whether the football has at any time been advanced to or beyond the vertical hairline reference therein to entitle the team in possession to a first down.

It should be noted that the roller bearing supports for the telescopes, in combination with the counterweights fixed thereon in vertical coincidence with the hairlines thereof, will at all times permit the telescopes to attain by self-adjustment positions wherein the vertical hairlines will be in an absolute vertical plane, thereby eliminating any possibility of sighting error by the official by reason of the ground supporting the instrument being unlevel. It is further important to note that the end of the lower housing component disposed toward the playing field is that end on which the inclined bottom edges of the side plates of the housing are formed which permits the entire housing assembly to be tilted about the axis of retaining pin 66 (as shown in dotted line in FIG. 3), thereby permitting the official to bring a football closely adjacent the sideline on which the instrument is located within sight of the telescope which is normally elevated above the grade or level of the playing field. This tilting action or ability of the instrument does not in anyway adversely affect the maintenance of the hairline of the telescopes in absolute vertical position at all times by reason of the self-righting constructions thereof.

As each first down is attained in the course of play the instrument is moved longitudinally of the playing field in substantially the same manner as it was brought into its first position of operation relative to the first positioning of the ball at the line of scrimmage following kickoff.

In addition to the primary intended use of the present invention as hereinbefore described, the device may also be used for laying out or marking off a football playing field with absolute accuracy. By placing the primary leg of the standard at an intended corner of the playing field and utilizing the perpendicular telescopes, one sideline and the remote reference markers (130) may be sighted and established as can one end line of the field. With these lines established the instrument is then moved around the field to establish all boundaries and all transverse yardage lines with absolute accuracy of angularity to one another.

Having thus described and explained our invention with reference to an operable embodiment thereof, and without intention to limit the scope of our conceptions beyond the requirements of the prior art, what we desire to claim is:

1. An instrument for determining attainment of first downs in the playing of a football game comprising, in combination, a stake, a chain having one end affixed to said stake adjacent one end thereof, a vertical standard to which the second end of said chain is affixed adjacent the base end of said standard, a rotatable platform on said standard, a pair of telescopes on said platform in fixed perpendicular relationship one to the other, a hairline in each of said telescopes, and self-righting means associated with each telescope whereby the hairlines therein automatically assume a true vertical position at all times regardless of the position of said platform.

2. A combination as defined in claim 1 wherein each of said telescopes is supported for rotation about the axis thereof one above the other, and wherein each telescope has a weight secured thereon in fixed eccentricity to the axis thereof.

3. A combination as defined in claim 2 wherein said rotatable platform consists of an element fixed on said standard, an element rotatably supported on said fixed element, and rack and pinion means engaging said fixed and rotatable elements with manual adjustment means therefor.

4. A combination as defined in claim 3 wherein each of said telescopes is supported for rotation about the axis thereof one above the other, and wherein each telescope has a weight secured thereon in fixed eccentricity to the axis thereof.

5. A combination as defined in claim 4 wherein said standard includes a ground penetrating and engaging base end.

6. A combination as defined in claim 4 wherein said telescopes are supported by a housing assembly, and said housing assembly is mounted on said platform by a horizontal pintle having rotatable support on said platform and fixed attachment to said housing assembly.

7. A combination as defined in claim 4 wherein the vertical axis of said standard lies in the plane of intersection of the two perpendicularly disposed telescopes.

8. In combination with a football playing field having fixed vertical reference marker beyond the ends of a marked sideline thereof, a visual instrument for determining attainment of first downs in a game played on said field comprising, in combination, a stake, a chain having one end secured adjacent the base of said stake, a vertical standard to the base of which the second end of said chain is secured, a rotatable platform on said standard, a pair of telescopes on said platform in fixed perpendicular relationship one to the other, each telescope being rotatably supported on its longitudinal axis, each telescope having a gravity controlled weight secured eccentrically of said telescope, and a hairline in each telescope being vertically disposed by gravitational location of the eccentric weight of said telescope.

9. A combination as defined in claim 8 wherein said telescopes are located one above the other and wherein the vertical axis of said standard lies in the plane of intersection of the two perpendicularly disposed telescopes.

10. A combination as defined in claim 9 wherein said rotatable platform consists of an element fixed on said standard, an element rotatably supported on said fixed element, and rack and pinion means engaging said fixed and rotatable elements with manual adjustment means therefor.

11. A combination as defined in claim 10 wherein said telescopes are supported by a housing assembly, and said housing assembly is mounted on said platform by a horizontal pintle having rotatable support on said platform and fixed attachment to said housing assembly.

12. A geometrical instrument comprising, a rotatable platform, a pair of telescopes rotatably supported about their longitudinal axes by said platform, said telescopes having their longitudinal axes in fixed perpendicular relationship, a weight fixed to each telescope eccentrically of its axis, and a hairline in each telescope maintained in a true vertical position by gravitational positioning of said eccentric weight.

References Cited by the Examiner
UNITED STATES PATENTS

| | | | |
|---|---|---|---|
| 13,584 | 9/1855 | Stinson | 33—46 |
| 870,809 | 11/1907 | Walker | 33—46 |
| 1,134,610 | 4/1915 | Hartmann | 33—46 |
| 2,335,066 | 11/1943 | Lamar. | |
| 2,869,238 | 1/1959 | Sterling | 33—46 |
| 2,935,792 | 5/1960 | Huffaker | 33—46 |
| 2,990,618 | 7/1961 | Petree et al. | 33—63 |

ROBERT B. HULL, *Primary Examiner.*